Jan. 18, 1949. W. F. COPP 2,459,625
WELDING TOGETHER METAL STRIP ENDS
Filed Nov. 1, 1946 5 Sheets-Sheet 1
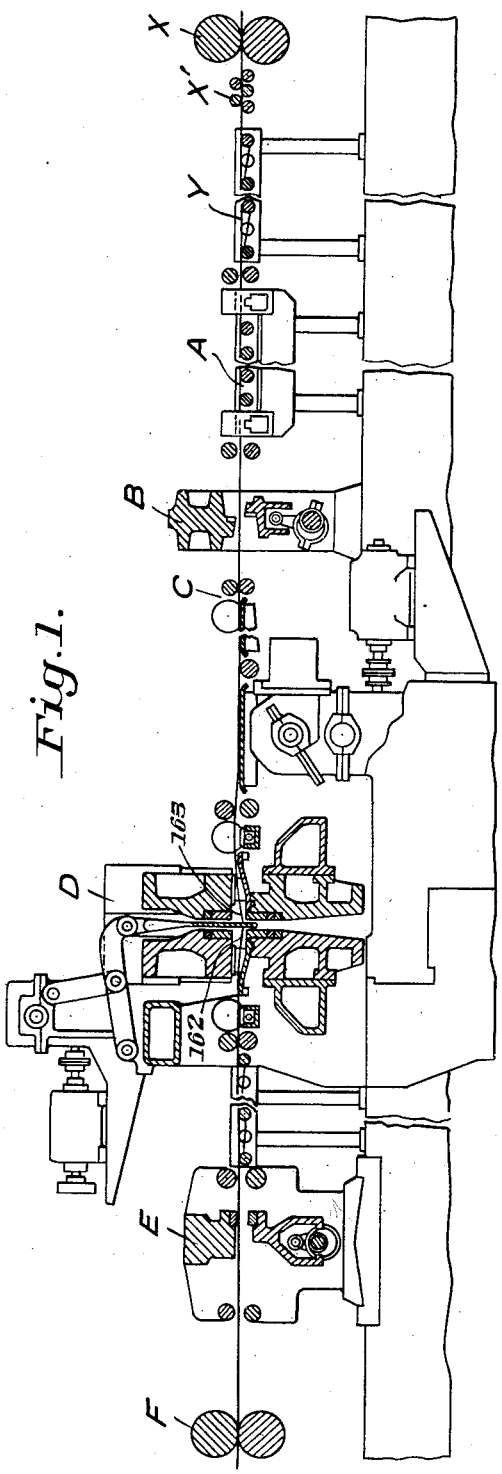
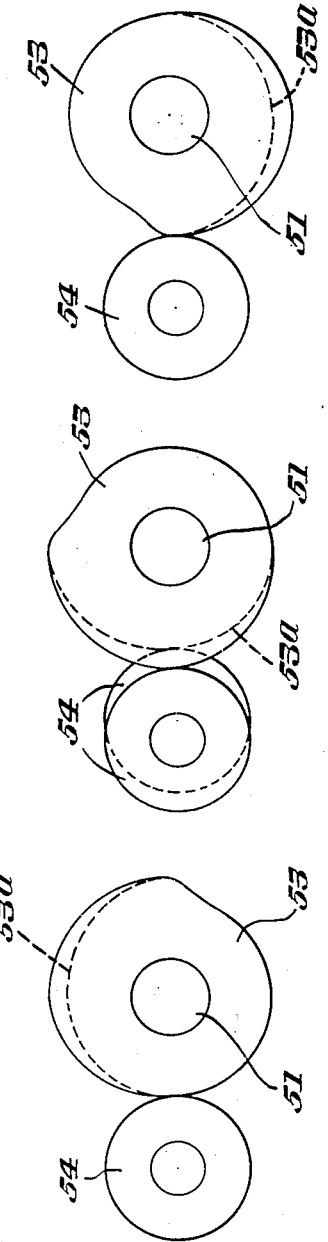
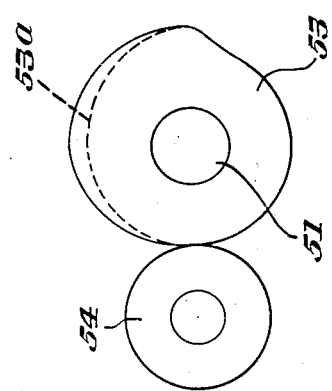
INVENTOR
Warren F. Copp

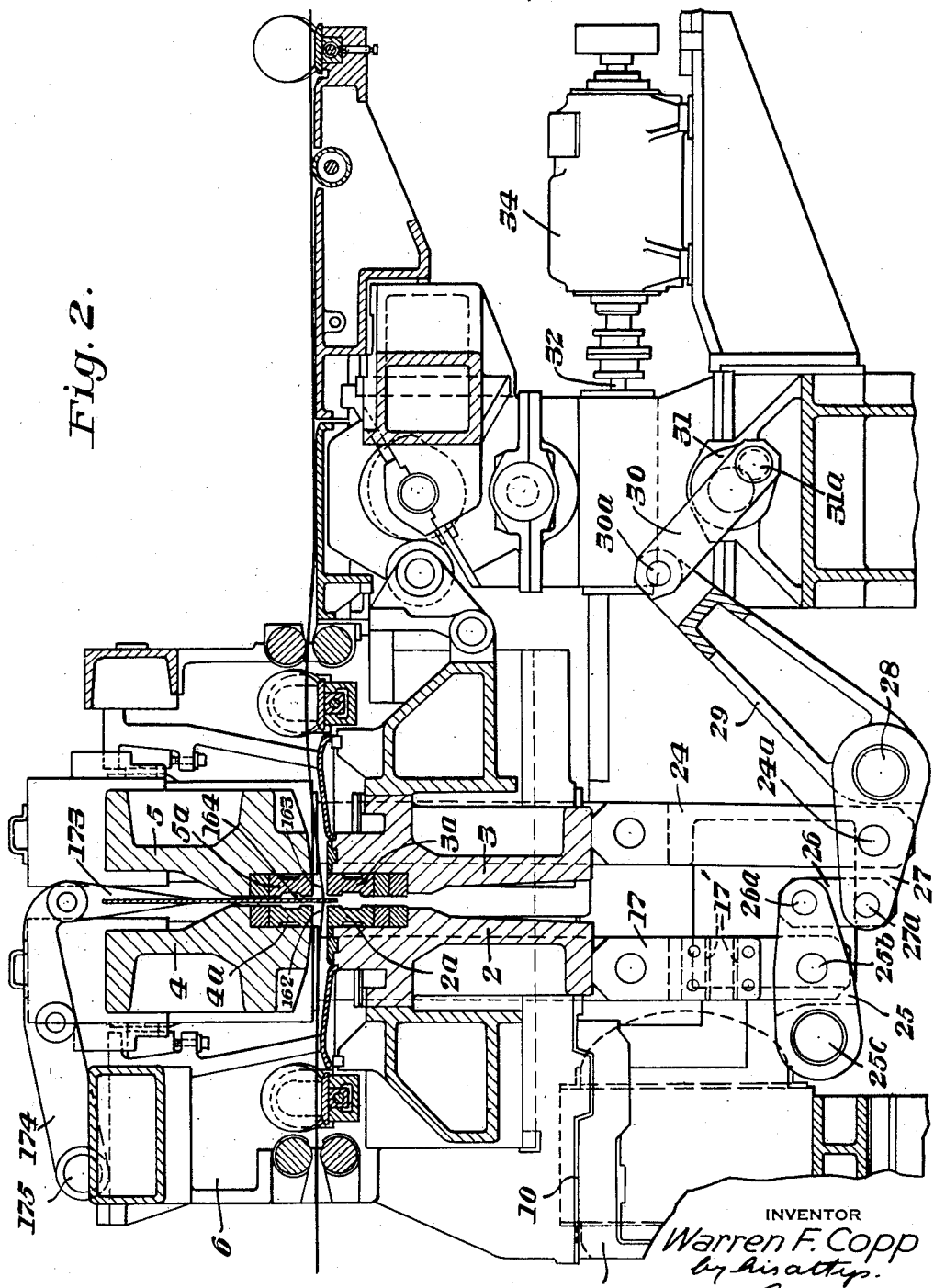

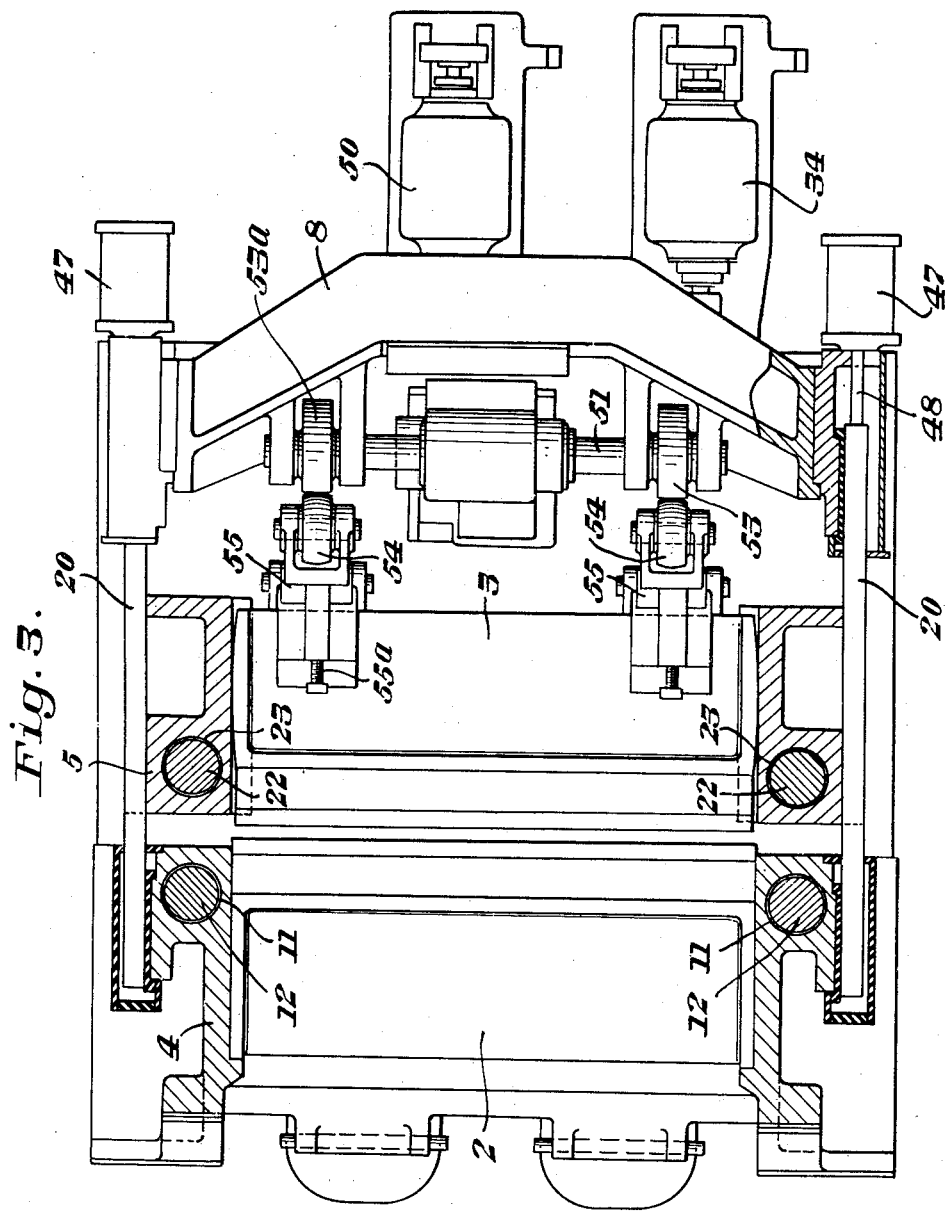

Jan. 18, 1949.   W. F. COPP   2,459,625
WELDING TOGETHER METAL STRIP ENDS
Filed Nov. 1, 1946   5 Sheets-Sheet 4
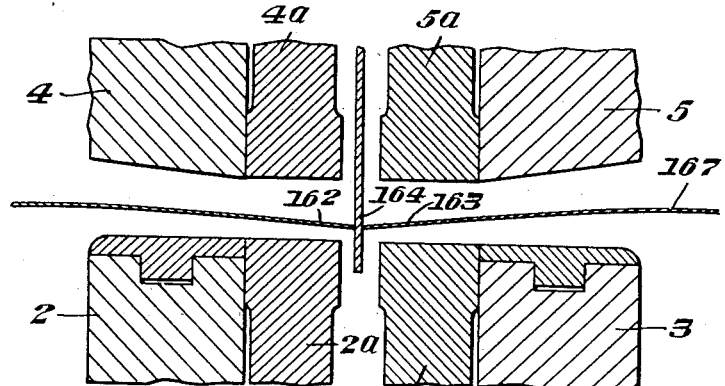
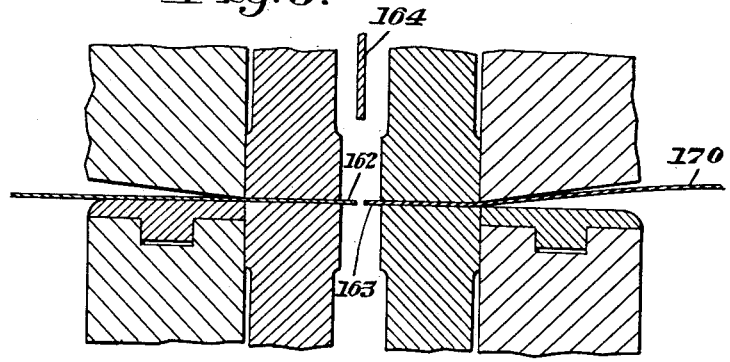
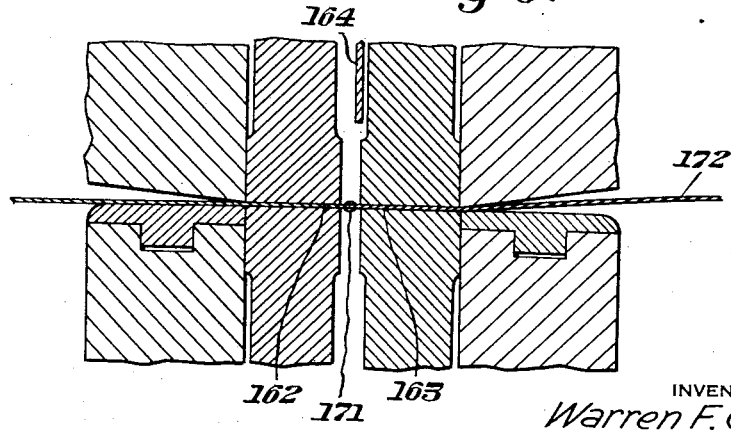
INVENTOR
Warren F. Copp Jan. 18, 1949. W. F. COPP 2,459,625
WELDING TOGETHER METAL STRIP ENDS
Filed Nov. 1, 1946 5 Sheets—Sheet 5
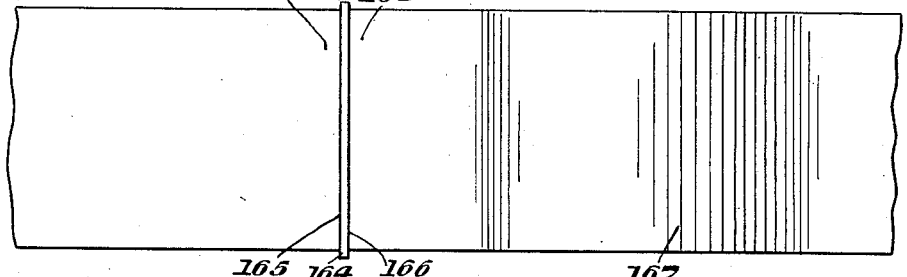
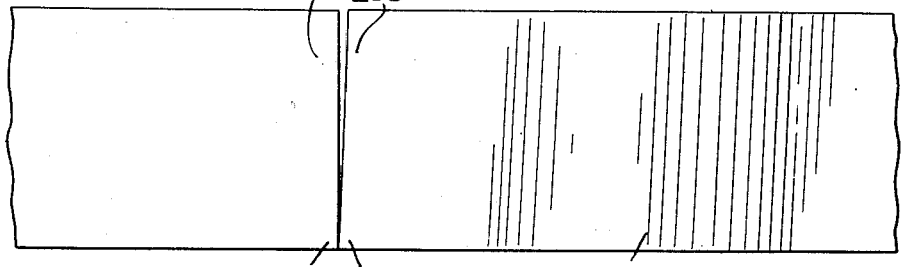
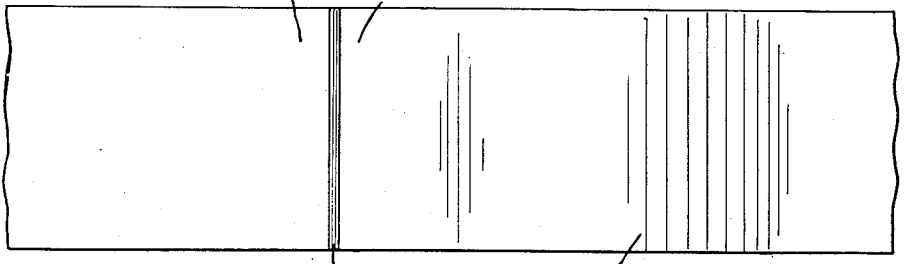
INVENTOR
Warren F. Copp
by his atty.

Patented Jan. 18, 1949

2,459,625

UNITED STATES PATENT OFFICE 2,459,625

WELDING TOGETHER METAL STRIP ENDS

Warren F. Copp, St. Clairsville, Ohio, assignor to Wheeling Steel Corporation, Wheeling, W. Va., a corporation of Delaware Application November 1, 1946, Serial No. 707,141

28 Claims. (Cl. 219—4)

This invention relates to welding together metal strip ends. It relates to a method and mechanism by which metal strip ends may be welded together more effectively and with greater uniformity than heretofore. The art of welding together metal strip ends is well developed and various methods and apparatus for the purpose have heretofore been proposed. The preferred type of weld for the purpose is a line flash weld. The strip ends are arranged in contact and current is passed therethrough and a line flash weld formed.

It is known that in forming a line flash weld in the welding together of strip ends it is desirable that at the time of formation of the weld the strip ends be non-parallel so that the weld is produced progressively along the joint. Normally the strip ends are brought into contact with each other when in non-parallel relation and the weld is formed progressively along the opposed strip ends. In this way a more uniform and satisfactory weld is produced than when the strip ends are arranged in parallelism at the time of weld formation. The reasons for this are known to those skilled in the art.

Various ways of bringing opposed strip ends into the desired non-parallel relation for welding have heretofore been proposed. One proposal has been to shear the strip ends at an angle differing slightly from a right angle to the strip axis so that the strip ends may be clamped flat and while flat moved toward each other on the so-called "push up" after formation of the weld but before the weld has hardened. This method involves some difficulty of very close adjustment of the shear for the proper angle cut. Moreover, on the push up a relatively greater amount of metal is forced into the weld at one end of the joint, the amount of metal per unit of length of the joint decreasing gradually from that end to the opposite end where the joint contains a minimum amount of metal.

It has also been proposed to shear the opposed strip ends at right angles to the strip axes and clamp the opposed strip ends in desired non-parallel relation to each other for welding. This has been done by the use of a gauger which tapers in thickness transversely of the strip ends, the opposed strip ends being pressed against the gauger which is intended to accurately position the strip ends in the desired non-parallel relation. This results in throwing a buckle into each strip adjacent its end; see Patents Nos. 2,203,151 and 2,253,709, wherein the weld is proposed to be formed with the opposed strip ends clamped in non-parallel relation with each strip buckled behind the clamp holding it, the ends being pushed together after formation of the weld by relative movement of the clamps toward each other.

My invention provides an improved method and mechanism for welding together metal strip ends by which an improved product, having the successive pieces better aligned, with consequent improvement in the cold-rolling operation, is secured. I preferably eliminate the transversely tapered gauger entirely. I shear the opposed strip ends at right angles to the strip axes. I preferably employ a gauger of uniform thickness transversely of the strips so that when the strips are brought into position with their ends abutting the opposite faces of the gauger the strip ends are in spaced apart parallel relation and the metal of each strip adjacent the end thereof is transversely straight, i. e., the strips lie flat and unbuckled. However, the advantages of my invention are partially obtained by employing a gauger having one face normal to the strip axis and the opposite face disposed at an angle differing slightly from a right angle to the strip axis. The use of such a gauger would permit one of the strips to lie flat and only one instead of both thereof would have to have a buckle thrown therein prior to welding.

Assuming that my preferred gauger of uniform thickness transversely of the strips is employed, each of the opposed strip ends is brought up against the gauger so that the opposed strip ends as above stated are in spaced apart parallel relation and both strips adjacent the ends thereof are flat and unbuckled. The strip ends are then gripped by clamps and the gauger is removed. Thereafter the strip ends are brought into non-parallel relation for the formation of a progressive line flash weld therebetween, after which they are returned to parallel relation during the push up, the result being that the composite strip is free from buckles and the weld is substantially uniform along the joint.

One of the strip ends may be clamped flat in fixed position with its end edge extending at right angles to its axis and may remain in that position without any movement whatsoever throughout the entire operation. The other strip end is turned at an angle to the fixed strip end, the progressive line flash weld formed and the second mentioned strip end turned back into parallelism with the fixed strip end during the push up after formation of the weld but before the weld has hardened. Not only is the resultant composite strip unbuckled but the amount of metal forced into the weld is uniform along the weld from edge to edge of the strip.

I provide a method of welding together metal strip ends comprising disposing metal strip ends in non-parallel but generally coplanar relation with the metal of one strip adjacent the end thereof transversely straight and the metal of the other strip adjacent the end thereof transversely buckled, progressively forming a line flash weld joining the strip ends and before hardening of the weld relatively advancing the strip ends and turning the end of the second mentioned strip relatively to the end of the first mentioned strip to eliminate the buckle in the second mentioned strip and produce a weld which is substantially uniform along the joint. Desirably as above explained the strip ends are initially disposed in generally parallel spaced apart relation and one only thereof is turned to bring it into non-parallel relation with the other strip end for formation of the progressive line flash weld.

I further provide mechanism for welding together metal strip ends comprising separate clamping means for respectively clamping metal strip ends in non-parallel but generally coplanar relation with the metal of one strip adjacent the end thereof transversely straight and the metal of the other strip adjacent the end thereof transversely buckled, means for progressively forming a line flash weld joining the strip ends and means for relatively advancing the respective clamping means and turning the clamping means clamping the end of the second mentioned strip relatively to the clamping means clamping the end of the first mentioned strip whereby to eliminate the buckle in the second mentioned strip and produce a weld which is substantially uniform along the joint. The details of my preferred mechanism for welding together metal strip ends will be described below.

Other details, objects and advantages of the invention will become apparent as the following description of a present preferred embodiment thereof and a present preferred method of practicing the same proceeds.

In the accompanying drawings I have shown a present preferred embodiment of the invention and a present preferred method of practicing the same, in which Figure 1 is a diagrammatic central vertical longitudinal cross-sectional view through mechanism for welding together metal strip ends with the auxiliary equipment employed therewith;

Figure 2 is an enlarged central vertical longitudinal cross-sectional view of the welding mechanism;

Figure 3 is a horizontal cross-sectional view through the welding mechanism shown in Figure 2;

Figures 4, 5 and 6 are fragmentary longitudinal cross-sectional views to enlarged scale through a portion of the mechanism in successive stages of operation;

Figures 7 and 8 are respectively plan and elevational diagrams showing the strip ends in position against the gauger at the beginning of the operation;

Figures 9 and 10 are views similar to Figure 7 and 8 showing the strip ends after withdrawal of the gauger and turning of one strip end to bring the strip ends into non-parallel relation for formation of a progressive line flash weld;

Figures 11 and 12 are similar views showing the strip ends welded together at the conclusion of the operation; and Figures 13, 14 and 15 are diagrams showing the cams for advancing one of the strip ends relatively to the other thereof during the push up and illustrating the differential motion which is produced.

Referring now more particularly to Figures 7 to 12, inclusive, Figure 7 is a plan view and Figure 8 an edge view of two metal strip ends 162 and 163 each sheared at right angles to the axis or length of the strip, the strip ends being disposed against a gauger 164 which is of uniform thickness transversely of the strips. The opposed faces 165 and 166 of the gauger are parallel. The strip end 162 is clamped flat and is held in fixed position throughout the entire operation. The strip end 163 is clamped adjacent the end thereof and a little slack is provided behind the clamp as indicated at 167. The slack 167 is to provide for buckling of the strip 163 behind the clamp in the next operation.

After the strip ends 162 and 163 have been positioned against the gauger 164 as shown in Figures 7 and 8 and clamped as above described the gauger is withdrawn. The strip end 162 remains in fixed position throughout the operation as above explained. The clamp holding the strip end 163 is moved to bring one corner 168 thereof into contact with the corresponding corner 169 of the strip end 162, the respective strip ends then being in non-parallel relation as shown in Figures 9 and 10. This throws into the strip end 163 back of the clamp a buckle 170 shown in Figures 9 and 10. Electric current is passed through the strip ends. A progressive line flash weld is formed along the joint in known manner.

After formation of the weld and before the weld has hardened the strip end 163 is pushed up against the strip end 162. This is done by moving the clamp holding the strip end 163 so that the strip end 163 is simultaneously moved toward the strip end 162 and turned back into parallelism therewith. This movement of the strip end 163 removes the buckle 170 and produces a weld which is substantially uniform along the joint. The weld is shown at 171 in Figures 11 and 12. The strip end 163 still has a slight slack 172 similar to the slack 167 shown in Figures 7 and 8 but of somewhat less magnitude because of the movement of the strip end 163 toward the strip end 162 during the operation explained. It is comparatively easy to properly position and align the strip ends against the gauger 164 which is of uniform thickness transversely of the strips and whose opposed faces are parallel at the portions thereof where they are engaged by the strip ends. The danger of improper positioning of the strip ends which occurs when a tapered gauger is used is entirely eliminated. The composite strip is free from buckles or strains and its strength is nowise reduced. The weld may be trimmed in usual manner and is at least as strong as the strips which are joined.

Referring now to Figure 1, there is shown the welding unit and the auxiliary mechanism employed in connection therewith. Hot rolled strips are fed by a pair of feed rolls X through leveler rolls X' and over a support table Y to a guide table unit A. From the guide table unit A they pass successively through a shear B, thence over a feeding and supporting table C to a welding unit D. After welding the strip material passes through a trimmer E and thence through a pair of reversible pinch rolls F to a succeeding operation, e. g., pickling or coiling.

The shear B functions to cut the ends of successive coils to form cooperating end faces which will be welded together in the unit D. The guide table A functions to present the strips to the shear B in proper position for cutting. The table C functions to support the strips and guide the edges thereof so as to direct successive strips accurately into the welding unit D.

The welding unit D functions to engage the adjacent ends of the two coils or strips to be welded and position them in the proper cooperative relationship for welding and effect a weld between the strip ends.

The trimmer E functions to remove excess metal from the weld, both at the top and at the bottom.

The pinch rolls F serve to pull the strips through the apparatus and also to feed the trailing end of a strip in the reverse direction back into the welding unit D so that the trailing end of the last welded strip or coil may be brought into proper relation to the leading end of the succeeding coil.

The welding unit D comprises two pairs of clamping members or jaws which grip the adjacent ends of the strips to be welded, the pairs of jaws being relatively movable so that the movement of the strip ends necessary for welding can be effected. The welding current is supplied through the jaws. Also associated with the jaws is a gauging device for the relative positioning of the strip ends prior to welding. This permits of readily carrying out the progressive line flash welding which is desirable in the welding together of metal strip ends.

The general arrangement of the clamping members or jaws is illustrated in Figure 2. There are two lower jaw members respectively numbered 2 and 3 and two upper jaw members respectively numbered 4 and 5. The jaw member 2 is fixed. The jaw member 4 is vertically reciprocable and cooperates with the jaw member 2 to clamp the trailing end of a strip to be welded. The jaw member 5 is vertically movable and cooperates with the jaw member 3 to clamp the leading end of a strip to be welded to the strip the trailing end of which is clamped between the jaw members 2 and 4. The jaw members 3 and 5 are so mounted that they can be moved as a unit toward or away from the jaw members 2 and 4.

The jaw member 2 is carried between standards 6 which are carried on side frames 7. The side frames 7 are suitably connected together, the connecting means including a yoke 8 (Figure 3) and preferably also a transformer base which is not shown in the drawings. The standards 6 are bolted to the side frames 7 by bolts not shown which are insulated from the side frames. Strips 10 of insulation are interposed between the standards 6 and the side frames 7, these electrically insulating the standards 6 from the main frame of the machine.

The jaw members 4 and 5 are so arranged that they will be moved up and down together. The mechanism for moving the jaw members 4 and 5 up and down is shown in Figure 2. The jaw member 4 is provided at each end with a cylindrical chamber 11 containing the upper end of a pulldown rod 12 (see Figure 3). The diameter of each chamber 11 is reduced at its upper end so as to form a downwardly facing shoulder against which the upper end of the corresponding rod 12 is adapted to seat. Each rod 12 is provided with a reduced upward extension, not shown, which projects beyond the upper surface of the jaw 4 where it is surrounded by a coil spring which bears against the undersurface of a plate fastened to the top of the extension and against the upper surface of the jaw 4. Thus the rods 12 are resiliently urged upwardly and their upward movement is limited when their upper surfaces seat against the downwardly facing shoulders above mentioned. The details of the structure for mounting of the jaw members form no part of the present invention and hence are not shown in their entirety. The general structure is like that disclosed in Patent No. 2,203,151.

The pulldown rods 12 extend downwardly through guideways in the standards 6 and each pivotally carries at its lower end a link 17. These links are built-up structures as shown at 17' having insulation therebetween so that the lower end of each link is electrically separate from its upper end. Actuation of the links 17 serves to raise or lower the pulldown rods 12 thereby raising or lowering the clamping jaw 4.

A similar mechanism is provided for raising or lowering the jaw member 5. That jaw member has at each end a chamber 23 similar to the chambers 11 in the jaw member 4, and in each chamber 23 is a pulldown rod 22 similar to the pulldown rods 12. The pulldown rods 22 are urged upwardly similarly to the pulldown rods 12. The pulldown rods 22 extend downwardly through guideways in the lower jaw member 3 and each pivotally carries at its lower end a link 24.

The mechanism for moving the jaw members 3 and 5 as a unit toward or away from the jaw members 2 and 4 is described below. It should be here noted, however, that the desired relative movement is accomplished by mounting the jaw member 3 together with the pulldown rods 22, upper jaw member 5 and associated mechanism on longitudinally extending slide bars 20, one at each side of the mechanism (see Figure 3). The slide bars 20 are mounted in slide bearings in the standards 6 and side frames 7.

The mechanism for actuating the jaw members 4 and 5 is so designed that the slides 20 may be moved back and forth so as to effect relative movement between the two sets of clamping jaw members without disturbing the action of the jaw member actuating mechanism.

As shown in Figure 2 the links 17 and 24 are interconnected by a jaw member actuating mechanism. The links 17 are respectively pivoted at 25b to levers 25. The levers 25 are rockable on a shaft 25c. They are respectively connected at their outer ends through pins 26a to vertically extending links 26. The respective links 26 are in turn connected through pins 27a to the outer ends of levers 27. Each lever 27 is connected to one of the links 24 by a pin 24a. The levers 27 are secured to a rock shaft 28. Rocking of the shaft 28 is effected by a lever 29 which is keyed to the shaft and is pivoted by a pin 30a to a link 30 which in turn is pivoted to the crank pin 31a of a crank 31. In Figure 2 the crank 31 is in the position corresponding to the extreme upward positions of the jaw members 4 and 5. Rotation of the crank 31 through 180° causes movement of the jaw members 4 and 5 from their extreme upward position to their extreme downward position. When the crank 31 rotates the links 24 and consequently the pulldown rods 22 are pulled downwardly bringing the jaw members 5 and 3 together. Overtravel is taken up by compression of the coil springs above referred to which surmount the jaw member 5. At the same time the levers 27 act through the links 26 to pull the levers 25 downwardly. This results in the links 17 and pulldown rods 12 being pulled downwardly, thus bringing the jaw members 4 and 2 together overtravel being taken care of similarly to overtravel of the jaw member 5 as above explained.

When the levers 27 are rocked from the lowermost position just described back to the position illustrated in Figure 2 the rods 12 and 22 will be positively moved upwardly. In the first part of the movement the springs will expand until the upper ends of the rods seat against the shouldered upper ends of the chamber 11 and 23 respectively.

Further upward movement of the rods causes the upper jaw members 4 and 5 to be positively lifted.

Thus the jaw members 4 and 5 are simultaneously actuated upwardly or downwardly as desired; also the jaw members 3 and 5 may be moved toward or away from the jaw members 2 and 4 without affecting the clamping action. The links 24 are substantially vertical and are of such length relative to the requisite amount of horizontal movement of the jaw members 3 and 5 that such movement does not affect the clamping action thereof. While a very slight upward or downward movement of the rods 22 will result theoretically from horizontal movement of the jaw members 3 and 5 it is trivial in amount and is entirely absorbed by the action of the springs above mentioned.

The crank 31 is turned through a worm drive, not shown, by a shaft 32 operated by a motor 34. A limit switch is provided to stop the motor 34 when the crank 31 is in the position of Figure 2.

The jaw members 2, 3, 4 and 5 are provided with clamping dies 2a, 3a, 4a and 5a, respectively. The dies apply the clamping pressure to the strips and the electric current also enters the metal of the strips therethrough.

I employ transformers of the character known to those skilled in the art generally used in flash welding. The transformers are connected in circuit with the dies so that when the strips are clamped and the current is on a weld may be formed in known manner. The electrical means for forming the weld form no part of the present invention.

The mechanism for effecting the movement of the jaw members 3 and 5 as a unit toward and away from the jaw members 2 and 4 as a unit will now be described. At each side of the machine there is a pullback cylinder 47 (Figure 3) having therein a piston connected through a piston rod 48 with one of the bars 20. Fluid under pressure is constantly admitted into the cylinders 47 to the left of the pistons therein viewing Figure 3 so that there is a constant tendency to move the jaw members 3 and 5 toward the right viewing Figures 2 and 3 relatively to jaw members 2 and 4 or in other words to separate the unit comprising the jaw members 3 and 5 and the unit comprising the jaw members 2 and 4.

The jaw members 3 and 5 are moved toward the jaw members 2 and 4 by a motor 50 connected to a cam shaft 51 through suitable reducing gearing. At each end of the cam shaft 51 there is a cam, the cams being designated 53 and 53a, respectively. The cams are shown diagrammatically in Figures 13, 14 and 15, the outline of cam 53 being shown in solid lines and the outline of cam 53a being the same as that of cam 53 except where the curved dotted line appears, at which part the contour of the cam 53a differs from that of the cam 53. The cams 53 and 53a bear against follower rolls 54 on brackets 55 adjustably carried by the lower jaw member 3. The brackets 55 may be adjusted on the jaw member 3 by means of adjusting screws 55a. A limit switch is connected to the reducing gearing through which the motor 50 is connected with the cam shaft 51, the limit switch controlling the motor 50 so that when actuated it rotates the cam shaft 51 through a single revolution corresponding to one welding cycle and then stops.

The purpose of the dissimilar cams 53 and 53a is to move the unit consisting of the jaw members 3 and 5 toward the unit consisting of the jaw members 2 and 4 with a differential or compound movement. This movement has been explained above in connection with Figures 7 to 12, inclusive. At the beginning of a cycle the jaw members 3 and 5 are positioned parallel to the jaw members 2 and 4. In this position the cams 53 and 53a are in the position shown in Figure 13. As the cam shaft 51 turns (in the counterclockwise direction in each of Figures 13, 14 and 15) the first 90° of cam 53 causes the lower corners of the jaw members 3 and 5, viewing Figure 3, to be advanced while the corresponding portion of the cam 53a, which is circular, does not cause the upper corners of the jaw members to be advanced. During the second 90° of rotation of the cam shaft 51 the cam 53 is circular holding the lower corners of the jaw members in place and the cam member 53a causes advancement of the upper corners of the jaw members until they catch up with the lower corners and the jaw members 3 and 5 are again parallel with the jaw members 2 and 4. Figure 14 shows the position of the cams when the jaw members 3 and 5 are at the maximum angle to the jaw members 2 and 4 and at the point when the jaw members 3 and 5 are ready to begin turning back into parallelism with the jaw members 2 and 4. The final 180° of the cams 53 and 53a allow return of the jaw members 3 and 5 toward the right in preparation for the succeeding cycle. Figure 15 shows the position of the cams when the jaw members 3 and 5 have been pushed up toward the jaw members 2 and 4 to the maximum extent and are parallel thereto.

The angular movement of the jaw members 3 and 5 is actually slight and is allowed for by reason of the fact that the pistons in the cylinders 47 can partake of differential movement and there will be sufficient lost motion in the parts to allow for the slight angular movement desired.

I provide for proper positioning of the strip ends prior to welding by the provision of a gauger 164 which consists of a plane metal plate of uniform thickness. The gauger is mounted in a bracket 173 connected with an arm 174 pivoted to the frame at 175. The gauger may be withdrawn from between the jaw members by movement of the arm 174 in the counterclockwise direction about the axis of the shaft 175 viewing Figure 2.

I shall now describe a cycle of operation referring particularly to Figures 4, 5 and 6. At the beginning of the cycle the gauger 164 is moved down to operative position in which it lies between the unit consisting of the jaw members 2 and 4 and the unit consisting of the jaw members 3 and 5. At that time the unit consisting of the jaw members 3 and 5 is moved away from the unit consisting of the jaw members 2 and 4 and the jaw members 4 and 5 are raised relatively to the jaw members 2 and 3, respectively. The strip ends 162 and 163 are then moved up in contact with the gauger 164 as shown in Figure 4. The gauger is as stated a plane plate with parallel faces, i. e., of uniform thickness. It is positioned at right angles to the axes of the strips. The strip ends are sheared at right angles to the strip axes. Consequently when the strip ends are moved up into engagement with the gauger the strips are positioned so that there is no buckle or strain in either thereof, the end edge of each strip lying throughout its length in contact with the gauger.

The next step is the lowering of the jaw members 4 and 5 to clamp the strip ends 162 and 163 against the jaw members 2 and 3, respectively.

Then the gauger is withdrawn. The parts as thus positioned are shown in Figure 5. The respective strip ends are clamped in coplanar parallel relation and spaced apart a distance equal to the thickness of the gauger. Neither strip end is buckled or distorted in any way. There is, however, as previously explained a slight amount of slack in the strip 163 to allow for the subsequent steps now to be explained. Throughout the entire operation the strip 162 remains clamped in fixed position.

The next step is turning of the cam shaft 51 from the position of Figure 13 to the position of Figure 14. This advances the near corner of the strip end 163, viewing Figure 5, to the left while the remote or far corner is not at the time substantially advanced. The result is to throw a slight buckle into the strip 163 as previously explained and to bring the strip ends into non-parallel position (see Figures 9 and 10). The cams are so designed relatively to the thickness of the gauger that the near corner of the strip end 163 is advanced just far enough to contact the strip end 162. Then with the strip ends in the position shown in Figures 9 and 10 a progressive line flash weld is formed therebetween as explained in the prior patents and as now understood by those skilled in the art. After formation of the weld but before the weld has hardened the cam shaft 51 turns from the position of Figure 14 which it occupies at the time the weld is formed to the position of Figure 15. This causes the push up at the joint and advances the far corner of the strip end 163 viewing Figure 6 relatively to the near corner and produces a weld which is substantially uniform along the joint. The weld is shown at 171 in Figure 6 and also in Figures 11 and 12. In the final movement of the jaw members 3 and 5 relatively to the jaw members 2 and 4 the temporary buckle 170 is removed from the strip 163 so that when the joint is formed the strip ends are free from any buckle, camber or strain.

As above explained the employment of a gauger of uniform thickness transversely of the strips is of importance as the difficulty of positioning the strip ends against the tapered gauger heretofore employed is entirely eliminated. Likewise the necessity of throwing a reverse buckle in one of the strips to compensate for a buckle in the other strip is obviated. The process and apparatus are extremely simple and accomplish a new result in a novel and improved manner.

While I have shown and described a present preferred embodiment of the invention and a present preferred method of practicing the same it is to be distinctly understood that the invention is not limited thereto but may be otherwise variously embodied and practiced within the scope of the following claims.

I claim:

1. A method of welding together metal strip ends comprising disposing metal strip ends in non-parallel but generally coplanar relation with the metal of one strip adjacent the end thereof transversely straight and the metal of the other strip adjacent the end thereof transversely buckled, progressively forming a line flash weld joining the strip ends and before hardening of the weld relatively advancing the strip ends and turning the end of the second mentioned strip relatively to the end of the first mentioned strip to eliminate the buckle in the second mentioned strip and produce a weld which is substantially uniform along the joint.

2. A method of welding together metal strip ends comprising disposing metal strip ends in generally parallel spaced apart relation, turning one of the strip ends only to bring it into non-parallel relation with the other strip end, progressively forming a line flash weld joining the strip ends and before hardening of the weld relatively advancing the strip ends and turning the first mentioned strip end back into substantial parallelism with the other strip end to produce a weld which is substantially uniform along the joint.

3. A method of welding together metal strip ends comprising clamping metal strip ends in non-parallel but generally coplanar relation with the metal of one strip adjacent the end thereof transversely straight and the metal of the other strip adjacent the end thereof transversely buckled, progressively forming a line flash weld joining the strip ends and before hardening of the weld and while maintaining stationary the clamp holding the first mentioned strip end advancing the clamp holding the second mentioned strip end toward the first mentioned clamp and turning the second mentioned clamp relatively to the first mentioned clamp to eliminate the buckle in the second mentioned strip and produce a weld which is substantially uniform along the joint.

4. A method of welding together metal strip ends comprising clamping metal strip ends in generally parallel spaced apart relation with the metal of the respective strips adjacent the ends thereof transversely straight, while maintaining stationary the clamp holding one strip end turning the clamp holding the other strip end to bring the second mentioned strip end into non-parallel relation with the first mentioned strip end and transversely buckle the second mentioned strip adjacent the end thereof, progressively forming a line flash weld joining the strip ends and before hardening of the weld and while still maintaining stationary the first mentioned clamp advancing the second mentioned clamp toward the first mentioned clamp and turning the second mentioned clamp relatively to the first mentioned clamp to eliminate the buckle in the second mentioned strip and produce a weld which is substantially uniform along the joint.

5. A method of welding together metal strip ends comprising advancing opposed strip ends toward each other until the ends are substantially parallel and spaced a predetermined distance, turning one of the strip ends to bring it into non-parallel relation with the other strip end, progressively forming a line flash weld joining the strip ends and before hardening of the weld relatively advancing the strip ends and turning the first mentioned strip end back into substantial parallelism with the other strip end to produce a weld which is substantially uniform along the joint.

6. A method of welding together metal strip ends comprising advancing opposed strip ends toward each other until the ends are substantially parallel and spaced a predetermined distance, separately clamping the strip ends in said relation, maintaining stationary the clamp holding one strip end while turning the clamp holding the other strip end to bring the second mentioned strip end into non-parallel relation with the first mentioned strip end, progressively forming a line flash weld joining the strip ends and before hardening of the weld and while still maintaining stationary the first mentioned clamp advancing the second mentioned clamp toward the first mentioned clamp and turning the second mentioned clamp relatively to the first mentioned clamp to turn the second mentioned strip end back into substantial parallelism with the first mentioned strip end to produce a weld which is substantially uniform along the joint.

7. A method of welding together metal strip ends comprising advancing opposed strip ends toward each other until the ends are substantially parallel and spaced a predetermined distance, separately clamping the strip ends in said relation, maintaining stationary the clamp holding one strip end while turning the clamp holding the other strip end to bring the second mentioned strip end into non-parallel relation with the first mentioned strip end and transversely buckle the second mentioned strip adjacent the end thereof, progressively forming a line flash weld joining the strip ends and before hardening of the weld and while still maintaining stationary the first mentioned clamp advancing the second mentioned clamp toward the first mentioned clamp and turning the second mentioned clamp relatively to the first mentioned clamp to turn the second mentioned strip end back into substantial parallelism with the first mentioned strip and to eliminate the buckle in the second mentioned strip and produce a weld which is substantially uniform along the joint.

8. A method of welding together metal strip ends comprising disposing metal strip ends in generally parallel spaced apart relation, maintaining one of the strip ends against turning, relatively advancing the strip ends toward each other, in so relatively advancing the strip ends relatively advancing laterally corresponding corners thereof ahead of the opposite laterally corresponding corners thereof to bring the strip ends into non-parallel relation and thereafter relatively advancing the second mentioned laterally corresponding corners of the strip ends so as to catch up with the first mentioned laterally corresponding corners thereof to bring the strip ends back into generally parallel relation and while the strip ends are in non-parallel relation progressively forming a line flash weld joining the strip ends, the last mentioned relative advancement being effected before hardening of the weld whereby to produce a weld which is substantially uniform along the joint.

9. A method of welding together metal strip ends comprising by separate clamps clamping respective opposed metal strip ends in generally parallel spaced apart relation, maintaining one of the clamps stationary, advancing the other clamp toward the first mentioned clamp, in so advancing the second mentioned clamp turning it so as to advance one leading corner of the strip clamped thereby relatively to the opposite corner thereof to bring the strip ends into non-parallel relation and thereafter turning the second mentioned clamp so as to advance the second mentioned leading corner of the strip clamped thereby relatively to the first mentioned leading corner thereof to bring the strip ends back into generally parallel relation and while the strip ends are in non-parallel relation progressively forming a line flash weld joining the strip ends, the last mentioned turning being effected before hardening of the weld whereby to produce a weld which is substantially uniform along the joint.

10. A method of welding together metal strip ends comprising advancing opposed strip ends toward each other until the ends are substantially parallel and spaced a predetermined distance, separately clamping the strip ends in said relation, maintaining one of the clamps stationary, advancing the other clamp toward the first mentioned clamp, in so advancing the second mentioned clamp turning it so as to advance one leading corner of the strip clamped thereby relatively to the opposite leading corner thereof to bring the strip ends into non-parallel relation, thereby buckling the strip clamped by the second mentioned clamp, and thereafter turning the second mentioned clamp so as to advance the second mentioned leading corner of the strip clamped thereby relatively to the first mentioned leading corner thereof to bring the strip ends back into generally parallel relation, thereby eliminating the buckle in the strip clamped by the second mentioned clamp, and while the strip ends are in non-parallel relation progressively forming a line flash weld joining the strip ends, the last mentioned turning being effected before hardening of the weld whereby to produce a weld which is substantially uniform along the joint.

11. Mechanism for welding together metal strip ends comprising separate clamping means for respectively clamping metal strip ends in non-parallel but generally coplanar relation with the metal of one strip adjacent the end thereof transversely straight and the metal of the other strip adjacent the end thereof transversely buckled, means for progressively forming a line flash weld joining the strip ends and means for relatively advancing the respective clamping means and turning the clamping means clamping the end of the second mentioned strip relatively to the clamping means clamping the end of the first mentioned strip whereby to eliminate the buckle in the second mentioned strip and produce a weld which is substantially uniform along the joint.

12. Mechanism for welding together metal strip ends comprising separate clamping means for respectively clamping metal strip ends in generally parallel spaced apart relation, means for turning one of the clamping means to bring the strip end clamped thereby into non-parallel relation with the other strip end, means for progressively forming a line flash weld joining the strip ends and means for relatively advancing the respective clamping means and turning the first mentioned clamping means to bring the strip end clamped thereby back into substantial parallelism with the other strip end to produce a weld which is substantially uniform along the joint.

13. Mechanism for welding together metal strip ends comprising first clamping means for clamping a strip end in fixed position with the metal of the strip adjacent the end thereof transversely straight, second clamping means for clamping a second strip end in non-parallel but generally coplanar relation with respect to the first mentioned strip end and with the metal adjacent the end thereof transversely buckled, means for progressively forming a line flash weld joining the strip ends and means for advancing the second clamping means toward the first clamping means and turning the second clamping means relatively to the first clamping means to eliminate the buckle in the second strip and produce a weld which is substantially uniform along the joint.

14. Mechanism for welding together metal strip ends comprising first clamping means for clamping a strip end in fixed position with the metal of the strip adjacent the end thereof transversely straight, second clamping means for clamping a second strip end in generally parallel relation to the first mentioned strip end and spaced there-from and with the metal of the strip adjacent the end thereof transversely straight, means for turning the second clamping means to bring the second strip end into non-parallel relation with the first mentioned strip end and transversely buckle the second strip adjacent the end thereof, means for progressively forming a line flash weld joining the strip ends and means for advancing the second clamping means toward the first clamping means and turning the second clamping means relatively to the first clamping means to eliminate the buckle in the second strip and produce a weld which is substantially uniform along the joint.

15. Mechanism for welding together metal strip ends comprising means for advancing opposed strip ends toward each other so as to engage and be positioned by a gauger, a gauger of uniform thickness transversely of the strips with which the opposed strip ends engage at opposite faces thereof, whereby the strip ends are positioned in generally parallel spaced apart relation, means for withdrawing the gauger, means for turning one of the strip ends to bring it into non-parallel relation with the other strip end, means for progressively forming a line flash weld joining the strip ends and means for relatively advancing the strip ends and turning the first mentioned strip end back into substantial parallelism with the other strip end to produce a weld which is substantially uniform along the joint.

16. Mechanism for welding together metal strip ends comprising a gauger of uniform thickness transversely of the strips with which the opposed strip ends engage at opposite faces thereof, whereby the strip ends are positioned in generally parallel spaced apart relation, the gauger being withdrawable from between the thus positioned strip ends, means operable after withdrawal of the gauger for relatively turning the strip ends to bring them into non-parellel relation, means for progressively forming a line flash weld joining the strip ends and means for relatively advancing the strip ends and relatively turning them back into substantial parallelism to produce a weld which is substantially uniform along the joint.

17. Mechanism for welding together metal strip ends comprising a gauger of uniform thickness transversely of the strips with which the opposed strip ends engage at opposite faces thereof, whereby the strip ends are positioned in generally parallel spaced apart relation, clamps for clamping the respective strip ends as thus positioned by the gauger, the gauger being withdrawable from between the clamped strip ends, means operable after withdrawal of the gauger for relatively turning the clamps to bring the strip ends into non-parallel relation, means for progressively forming a line flash weld joining the strip ends and means for relatively advancing the clamps and relatively turning them to bring the strip ends back into substantial parallelism to produce a weld which is substantially uniform along the joint.

18. Mechanism for welding together metal strip ends comprising a gauger of uniform thickness transversely of the strips with which the opposed strip ends engage at opposite faces thereof, whereby the strip ends are positioned in generally parallel spaced apart relation, a first clamp for fixedly clamping one strip end as thus positioned by the gauger, a second clamp for clamping the other strip end as thus positioned by the gauger, the gauger being withdrawable from between the clamped strip ends, means operable after withdrawal of the gauger for turning the second clamp to bring the strip ends into non-parallel relation, means for progressively forming a line flash weld joining the strip ends and means for advancing the second clamp toward the first clamp and turning the second clamp to bring the strip ends back into substantial parallelism to produce a weld which is substantially uniform along the joint.

19. Mechanism for welding together metal strip ends comprising separate clamps for respectively clamping metal strip ends in generally parallel spaced apart relation, means maintaining one of the clamps against turning, means for relatively advancing the clamps toward each other and in so relatively advancing the clamps relatively shifting the same to advance laterally corresponding corners of the strip ends ahead of the opposite laterally corresponding corners thereof to bring the strip ends into non-parallel relation and thereafter advance the second mentioned laterally corresponding corners of the strip ends so as to catch up with the first mentioned laterally corresponding corners thereof to bring the strip ends back into generally parallel relation and means for progressively forming a line flash weld joining the strip ends while the strip ends are in non-parallel relation.

20. Mechanism for welding together metal strip ends comprising separate clamps for respectively clamping metal strip ends in generally parallel spaced apart relation, means maintaining one of the clamps against turning, means for relatively advancing the clamps toward each other, said means including separate rotatable cams, one at each side of the longitudinal center line of one of the clamps, differentially operable to relatively advance the clamps and while advancing them to relatively shift the same to advance laterally corresponding corners of the strip ends ahead of the opposite laterally corresponding corners thereof to bring the strip ends into non-parallel relation and thereafter advance the second mentioned laterally corresponding corners of the strip ends so as to catch up with the first mentioned laterally corresponding corners thereof to bring the strip ends back into generally parallel relation and means for progressively forming a line flash weld joining the strip ends while the strip ends are in non-parallel relation.

21. Mechanism for welding together metal strip ends comprising separate clamps for respectively clamping metal strip ends in generally parallel spaced apart relation, means maintaining one of the clamps in fixed position, means for advancing the other clamp toward the first mentioned clamp and in so doing shifting the second mentioned clamp to advance one corner of the strip end ahead of the opposite corner to bring the strip ends into non-parallel relation and thereafter advance the second mentioned corner so as to catch up with the first mentioned corner to bring the strip ends back into generally parallel relation and means for progressively forming a line flash weld joining the strip ends while the strip ends are in non-parallel relation.

22. Mechanism for welding together metal strip ends comprising separate clamps for respectively clamping metal strip ends in generally parallel spaced apart relation, means maintaining one of the clamps in fixed position, means for advancing the other clamp toward the first mentioned clamp, said means including separate rotatable cams, one at each side of the longitudinal center line of the second mentioned clamp, differentially operable to shift the second mentioned clamp to advance one corner of the strip ahead of the opposite corner to bring the strip ends into non-parallel relation and thereafter advance the second mentioned corner so as to catch up with the first mentioned corner to bring the strip ends back into generally parallel relation and means for progressively forming a line flash weld joining the strip ends while the strip ends are in non-parallel relation.

23. Mechanism for welding together metal strip ends comprising a gauger of uniform thickness transversely of the strips with which the opposed strip ends engage at opposite faces thereof, whereby the strip ends are positioned in generally parallel spaced apart relation, separate clamps for respectively clamping the strip ends in said relation, the gauger being withdrawable from between the clamped strip ends, means operable after withdrawal of the gauger for relatively advancing the clamps toward each other and while so relatively advancing the clamps relatively shifting the same to advance laterally corresponding corners of the strip ends ahead of the opposite laterally corresponding corners thereof to bring the strip ends into non-parallel relation and thereafter advance the second mentioned laterally corresponding corners of the strip ends so as to catch up with the first mentioned laterally corresponding corners thereof to bring the strip ends back into generally parallel relation and means for progressively forming a line flash weld joining the strip ends while the strip ends are in non-parallel relation.

24. Mechanism for welding together metal strip ends comprising a gauger of uniform thickness transversely of the strips with which the opposed strip ends engage at opposite faces thereof, whereby the strip ends are positioned in generally parallel spaced apart relation, separate clamps for respectively clamping the strip ends in said relation, means maintaining one of the clamps in fixed position, the gauger being withdrawable from between the clamped strip ends, means operable after withdrawal of the gauger for advancing the other clamp toward the first mentioned clamp, said means including separate rotatable cams, one at each side of the longitudinal center line of the second mentioned clamp, differentially operable to shift the second mentioned clamp to advance one corner of the strip ahead of the opposite corner to bring the strip ends into non-parallel relation and thereafter advance the second mentioned corner so as to catch up with the first mentioned corner to bring the strip ends back into generally parallel relation and means for progressively forming a line flash weld joining the strip ends while the strip ends are in non-parallel relation.

25. Mechanism for welding together metal strip ends comprising separate clamps for respectively clamping metal strip ends in generally opposed coplanar relation, the clamps being mounted for relative movement generally toward and away from each other generally parallel to the plane of the strip ends, guide means for guiding at least one of the clamps in said relative movement, said clamp being guided by the guide means generally in said plane but being turnable with respect to the guide means as well as movable with respect thereto generally toward and away from the other clamp so that the relative angularity of the strip ends may be altered, and means for supplying welding current to the strips whereby a line flash weld joining the strip ends may be formed.

26. Mechanism for welding together metal strip ends comprising separate clamps for respectively clamping metal strip ends in generally opposed coplanar relation, the clamps being mounted for relative movement generally toward and away from each other generally parallel to the plane of the strip ends, guide means for guiding at least one of the clamps in said relative movement, said clamp being guided by the guide means generally in said plane but being turnable with respect to the guide means as well as movable with respect thereof generally toward and away from the other clamp so that the relative angularity of the strip ends may be altered, means for moving said clamp relatively to the guide means so that first one corner of the strip clamped by said clamp is advanced toward the other strip relatively to the opposite corner thereof and subsequently the opposite corner is advanced so as to catch up with the first mentioned corner and means operable when the strip ends are non-parallel for forming a line flash weld joining the strip ends.

27. Mechanism for welding together metal strip ends comprising separate clamps for respectively clamping metal strip ends in generally opposed coplanar relation, the clamps being mounted for relative movement generally toward and away from each other generally parallel to the plane of the strip ends, guide means for guiding at least one of the clamps in said relative movement, said clamp being guided by the guide means generally in said plane but one of said clamp and the guide means having edges curving away from the other thereof so that said clamp is turnable with respect to the guide means as well as movable with respect thereto generally toward and away from the other clamp so that the relative angularity of the strip ends may be altered, and means for supplying welding current to the strips whereby a line flash weld joining the strip ends may be formed.

28. Mechanism for welding together metal strip ends comprising a gauger of uniform thickness transversely of the strips with which the opposed strip ends engage at opposite faces thereof, whereby the strip ends are positioned in generally parallel spaced apart relation, separate clamps for respectively clamping the strip ends in said relation, the gauger being withdrawable from between the clamped strip ends, the clamps being mounted for relative movement after withdrawal of the gauger generally toward each other generally parallel to the plane of the strip ends, guide means for guiding at least one of the clamps in said relative movement, said clamp being guided by the guide means generally in said plane but being turnable with respect to the guide means as well as movable with respect thereto generally toward and away from the other clamp so that the relative angularity of the strip ends may be altered, and means for supplying welding current to the strips whereby a line flash weld joining the strip ends may be formed.

WARREN F. COPP.

REFERENCES CITED

The following references are of record in the file of this patent:

UNITED STATES PATENTS

| Number | Name | Date |
| --- | --- | --- |
| 2,203,151 | Iverson | June 4, 1940 |

Certificate of Correction

Patent No. 2,459,625.

January 18, 1949.

WARREN F. COPP

It is hereby certified that errors appear in the printed specification of the above numbered patent requiring correction as follows:

Column 3, line 36, after the word "ends" insert *together*; column 13, line 41, claim 16, for "non-parellel" read *non-parallel*;

and that the said Letters Patent should be read with these corrections therein that the same may conform to the record of the case in the Patent Office.

Signed and sealed this 24th day of May, A. D. 1949.

[SEAL]

THOMAS F. MURPHY,
*Assistant Commissioner of Patents.*